US011428580B2

(12) United States Patent
Park et al.

(10) Patent No.: US 11,428,580 B2
(45) Date of Patent: Aug. 30, 2022

(54) BRACKET FOR FIXING TEMPERATURE SENSOR, HEAT EXCHANGER INCLUDING THE BRACKET, AND WATER HEATING APPARATUS USING THE HEAT EXCHANGER FOR FREEZE PROTECTION

(71) Applicant: KYUNGDONG NAVIEN CO., LTD., Gyeonggi-do (KR)

(72) Inventors: Jun Kyu Park, Seoul (KR); Jeon Hur, Seoul (KR); Whee Jun Lim, Seoul (KR)

(73) Assignee: KYUNGDONG NAVIEN CO., LTD, Gyeonggi-do (KR)

( * ) Notice: Subject to any disclaimer, the term of this patent is extended or adjusted under 35 U.S.C. 154(b) by 29 days.

(21) Appl. No.: 17/017,163

(22) Filed: Sep. 10, 2020

(65) Prior Publication Data

US 2021/0072093 A1    Mar. 11, 2021

(30) Foreign Application Priority Data

Sep. 11, 2019    (KR) .......................... 10-2019-0113104

(51) Int. Cl.
*G01K 1/14*       (2021.01)
*G01K 1/143*     (2021.01)
(Continued)

(52) U.S. Cl.
CPC ......... *G01K 1/143* (2013.01); *F24D 19/0095* (2013.01); *F24H 9/2035* (2013.01); *F28F 9/04* (2013.01); *F28F 27/00* (2013.01)

(58) Field of Classification Search
CPC ...................................................... G01K 1/143
See application file for complete search history.

(56) References Cited

U.S. PATENT DOCUMENTS 2,048,680 A * 7/1936 Bird ....................... G01K 1/143
                                                                136/232
4,411,537 A * 10/1983 Grimm .................. G01K 1/143
                                                                 338/28
(Continued)

FOREIGN PATENT DOCUMENTS

JP       2018-128197 A    8/2018
KR   20-1989-0022506 U   12/1989
KR   10-1999-0017377 A    3/1999

OTHER PUBLICATIONS

First Examination Report for corresponding Australian Patent Application No. 2020230317, dated Sep. 27, 2021, 11 pages long.
(Continued)

*Primary Examiner* — Nathaniel Herzfeld
(74) *Attorney, Agent, or Firm* — Wegman Hessler (57) ABSTRACT

A heat exchanger according to the present disclosure includes a plurality of tubes through which heating water flows, a housing having an interior space in which the plurality of tubes are disposed and through which a combustion gas passes, the housing including a plurality of flow passage caps connected with distal ends of the plurality of tubes to cause the heating water to flow through the flow passage caps, a temperature sensor brought into close contact with an area between two flow passage caps adjacent to each other among the plurality of flow passage caps to obtain a temperature, and a bracket coupled to the housing to bring the temperature sensor into close contact with the area between the adjacent two flow passage caps.

11 Claims, 7 Drawing Sheets

(51) Int. Cl.
    *F28F 27/00*     (2006.01)
    *F24H 9/20*     (2022.01)
    *F24D 19/00*     (2006.01)
    *F28F 9/04*     (2006.01)

(56) References Cited

U.S. PATENT DOCUMENTS

| | | | |
|---|---|---|---|
| 6,550,962 B1* | 4/2003 | Yang | F16L 3/04 |
| | | | 24/458 |
| 7,597,472 B2* | 10/2009 | Hang | G01K 1/143 |
| | | | 24/458 |
| 8,113,710 B2* | 2/2012 | Li | H01L 23/34 |
| | | | 374/208 |
| 9,557,749 B2 | 1/2017 | Sheppard et al. | |
| 10,481,012 B2 | 11/2019 | Nagasaka et al. | |
| 2010/0019480 A1 | 1/2010 | Domin et al. | |
| 2016/0273969 A1 | 9/2016 | Lesage | |
| 2017/0307254 A1* | 10/2017 | Qiu | F24H 9/2014 |
| 2018/0224337 A1 | 8/2018 | Nagasaka et al. | |

OTHER PUBLICATIONS

First Office Action for Korean Patent Application No. 10-2019-0113104 dated Oct. 18, 2021, 7 pages long.

* cited by examiner

BRACKET FOR FIXING TEMPERATURE SENSOR, HEAT EXCHANGER INCLUDING THE BRACKET, AND WATER HEATING APPARATUS USING THE HEAT EXCHANGER FOR FREEZE PROTECTION

CROSS-REFERENCE TO RELATED APPLICATION

This application claims the benefit of priority to Korean Patent Application No. 10-2019-0113104, filed in the Korean Intellectual Property Office on Sep. 11, 2019, the entire contents of which are incorporated herein by reference.

TECHNICAL FIELD

The present disclosure relates to a bracket for fixing a temperature sensor, a heat exchanger, and a water heating apparatus for freeze protection.

BACKGROUND

A water heating apparatus is an apparatus that transfers heat generated by a combustion reaction to water to heat the water and uses the heated water for heating or the supply of hot water. Accordingly, a process of introducing water into the water heating apparatus, heating the introduced water, and thereafter releasing the heated water is performed.

In a case where the water heating apparatus is exposed to a low-temperature environment, water received in a pipe included in the water heating apparatus may be frozen, and therefore the water heating apparatus may be damaged. The low-temperature environment around the water heating apparatus may be considered to cause the water heating apparatus to freeze. Furthermore, the water heating apparatus may freeze due to low-temperature air reversely introduced through an exhaust hole of the stopped water heating apparatus. The freezing is referred to as wind-chill.

Not all of situations in which air is reversely introduced through the exhaust hole of the water heating apparatus cause the water heating apparatus to freeze. When low-temperature air is introduced into the water heating apparatus and lowers the temperature in a heat exchanger included in the water heating apparatus to a temperature lower than a critical temperature, the water heating apparatus may freeze.

SUMMARY

The present disclosure has been made to solve the above-mentioned problems occurring in the prior art while advantages achieved by the prior art are maintained intact.

An aspect of the present disclosure provides a bracket for fixing a temperature sensor, a heat exchanger to which the temperature sensor is fixed, and a water heating apparatus for freeze protection.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a heat exchanger includes a plurality of tubes through which heating water flows, a housing having an interior space in which the plurality of tubes are disposed and through which a combustion gas passes, the housing including a plurality of flow passage caps connected with distal ends of the plurality of tubes to cause the heating water to flow through the flow passage caps, a temperature sensor brought into close contact with an area between two flow passage caps adjacent to each other among the plurality of flow passage caps to obtain a temperature, and a bracket coupled to the housing to bring the temperature sensor into close contact with the area between the adjacent two flow passage caps.

According to another aspect of the present disclosure, a bracket for brining a temperature sensor into close contact with a housing such that the temperature sensor obtains temperature of the housing that surrounds an interior space of a heat exchanger includes a coupling part coupled to the housing and a body extending in a bent structure from the coupling part toward an area between flow passage caps to bring the temperature sensor into close contact with the area between the flow passage caps of the housing.

According to another aspect of the present disclosure, a water heating apparatus includes a burner that causes a combustion reaction, a heat exchanger including tubes through which heating water flows, an interior space in which a combustion gas generated by the combustion reaction exchanges heat with the tubes, and a plurality of flow passage caps connected with distal ends of the tubes to cause the heating water to flow through the flow passage caps, a temperature sensor brought into close contact with an area between two flow passage caps adjacent to each other among the plurality of flow passage caps to obtain a temperature, a bracket coupled to the heat exchanger to bring the temperature sensor into close contact with the heat exchanger, and a processor that is electrically connected with the temperature sensor and the burner and that performs control such that the burner operates when the temperature obtained by the temperature sensor is lower than or equal to a predetermined freezing temperature.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the components. When a component is described as "connected", "coupled", or "linked" to another component, this may mean the components are not only directly "connected", "coupled", or "linked" but also are indirectly "connected", "coupled", or "linked" via a third component.

Figure 1:
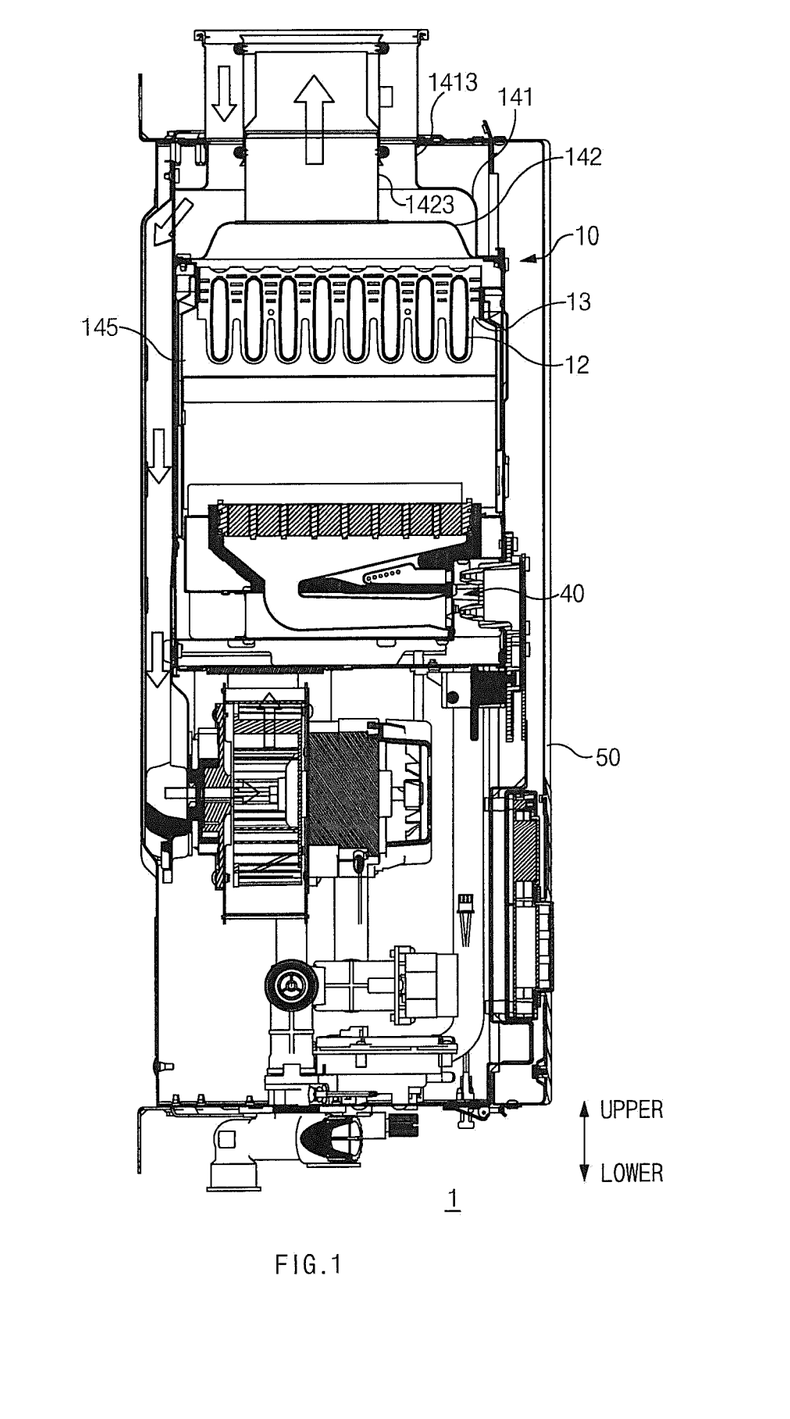
FIG. 1 is a view illustrating an internal structure of a water heating apparatus according to an embodiment of the present disclosure.

FIG. 1 is a view illustrating an internal structure of a water heating apparatus 1 according to an embodiment of the present disclosure.

Referring to FIG. 1, the water heating apparatus 1 according to an embodiment of the present disclosure may include a burner 40, a heat exchanger 10, a temperature sensor 30, a bracket 20, and a processor. The water heating apparatus 1 may further include a case 50, an air supply duct, and a blower.

The burner 40 is a component that burns a fuel gas and supplied air together. Heat and combustion gases may be generated by the combustion reaction. The air may be introduced into the case 50 of the heat exchanger 10 from the outside through the air supply duct, and the blower may forcibly feed the introduced air into the burner 40. The air flow is represented by arrows in FIG. 1.

The processor is a component that is electrically connected to other components of the water heating apparatus 1 and that performs control on the components. In particular, the processor may be electrically connected with the temperature sensor 30 and the burner 40 and may perform control such that the burner 40 operates when a temperature obtained by the temperature sensor 30 is lower than or equal to a predetermined freezing temperature.

The processor may include a microprocessor such as a field programmable gate array (FPGA), an application specific integrated circuit (ASIC), or a central processing unit (CPU). However, the type of a computing device included in the processor is not limited thereto.

The processor may include a memory that stores a plurality of control instructions, on the basis of which the processor generates instructions for controlling the components. The processor may be programmed to receive the control instructions from the memory and generate electrical signals for controlling the components, based on the received control instructions. The memory may be a data store such as a hard disk drive (HDD), a solid state drive (SSD), a volatile medium, a non-volatile medium, or the like. However, the type of the memory is not limited thereto.

Temperature Sensor (30)

The temperature sensor 30 is a component that obtains a temperature. The temperature sensor 30 may include, but is not limited to, a thermocouple that obtains a temperature from an electromotive force difference depending on temperature, a resistance temperature device (RTD) and a thermistor that obtain a temperature using a resistance change depending on temperature, and a bimetal temperature sensor that uses a length change depending on temperature.

The temperature sensor 30 may have a shape that extends in the up/down direction as illustrated. The temperature sensor 30 may include a temperature acquisition part 31 that makes contact with a predetermined position and obtains the temperature of the corresponding position and a wire 32 that transfers, to the processor, an electrical signal to which the temperature obtained is converted in the temperature acquisition part 31. The temperature sensor 30 may be electrically connected with the processor by the wire 32. The temperature obtained by the temperature sensor 30 may be transferred as an electrical signal to the processor through the wire 32, and the processor may perform control using the temperature transferred in the form of an electrical signal.

The temperature sensor 30 may be disposed at a predetermined position by the bracket 20. The position at which the temperature sensor 30 is disposed by the bracket 20 will be described below in the description of the heat exchanger 10 and the bracket 20.

Heat Exchanger (10)

Figure 2:
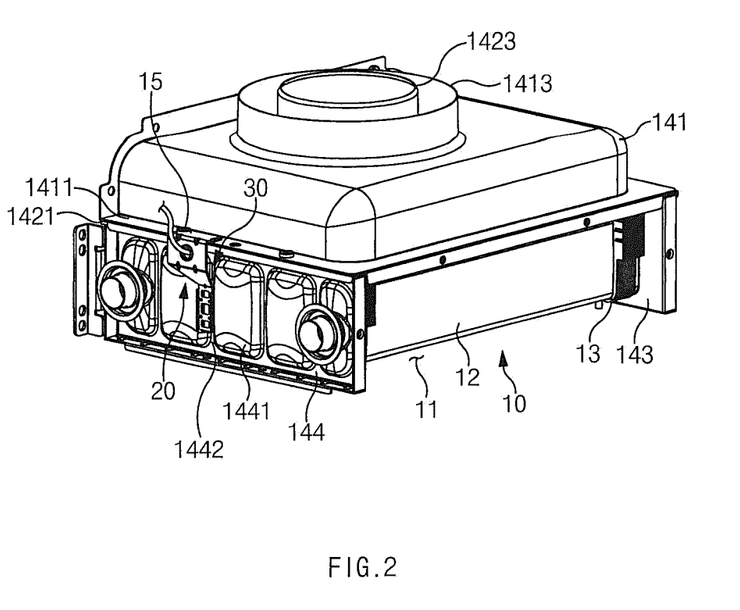
FIG. 2 is a perspective view illustrating a heat exchanger according to an embodiment of the present disclosure.
Figure 3:
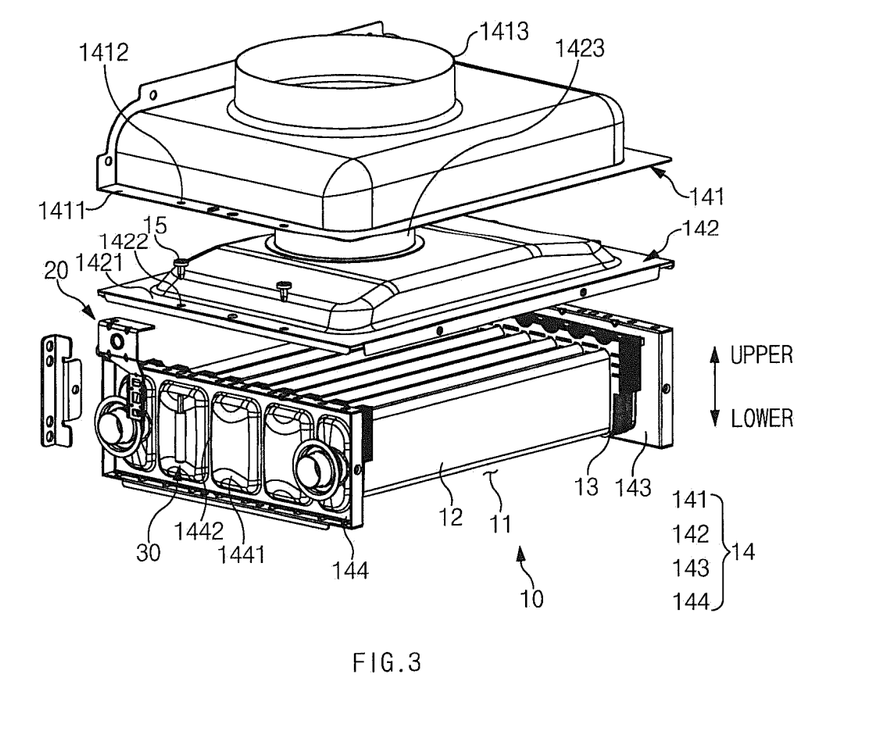
FIG. 3 is an exploded perspective view of the heat exchanger according to an embodiment of the present disclosure.
Figure 4:
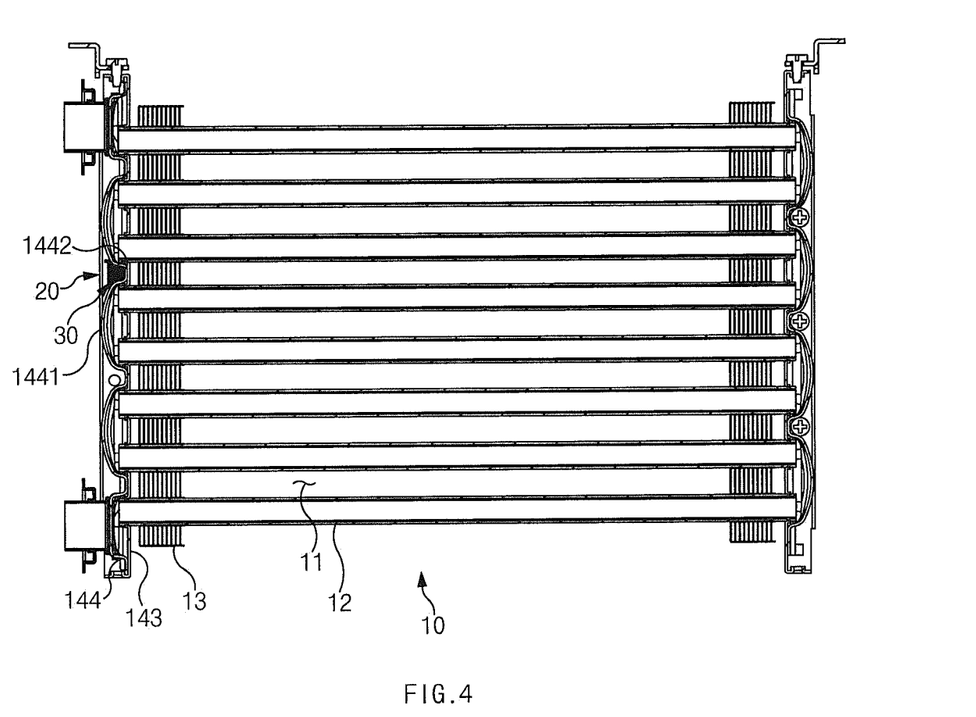
FIG. 4 is a transverse cross-sectional view of the heat exchanger according to an embodiment of the present disclosure.

FIG. 2 is a perspective view illustrating the heat exchanger 10 according to an embodiment of the present disclosure. FIG. 3 is an exploded perspective view of the heat exchanger 10 according to an embodiment of the present disclosure. FIG. 4 is a transverse cross-sectional view of the heat exchanger 10 according to an embodiment of the present disclosure.

The heat exchanger 10 will be described with additional reference to FIGS. 2 to 4. The heat exchanger 10 is a component that transfers heat generated by a combustion reaction in the burner 40 to water. The heat exchanger 10 may include a tube 12 and a housing 14 that forms an interior space 11 in which the tube 12 is received. The heat exchanger 10 may further include the bracket 20 that will be described below and the temperature sensor 30.

The tube 12 is a component of a pipe type through which water flows. The interior of the tube 12 may be formed in a flat shape in which the width in the left/right direction is smaller than the height in the up/down direction. A plurality of tubes 12 may be provided. The plurality of tubes 12 may be arranged at predetermined intervals in the left/right direction, and opposite ends of the plurality of tubes 12 may be connected with the interiors of flow passage caps 1441 of the housing 14. Accordingly, a flow passage through which water flows may be formed by the tubes 12 and the flow passage caps 1441. The water flowing through the flow passage may be heated by sensible heat generated by a combustion reaction in the burner 40 and heat transferred by combustion gases that are products of the combustion reaction.

A turbulator may be additionally disposed in the tubes 12 to make the water flow become turbulent.

A fin 13 may be coupled to the tubes 12. The fin 13 is a plate-shaped component through which the tubes 12 pass. The fin 13 may serve to raise the thermal conductivity of the tubes 12 by increasing cross-sectional areas. A plurality of fins 13 may be disposed along the direction in which the tubes 12 extend.

The housing 14 is a component that serves as the external appearance of the heat exchanger 10. The housing 14 may include side plates 145, through-plates 143, flow passage cap plates 144, an upper inner plate 142, and an upper outer plate 141 and may have the interior space 11 surrounded by these components.

The interior space 11 of the housing 14 may be connected to the burner 40. The burner 40 may be disposed under the heat exchanger 10, and the heat exchanger 10 may be open at the bottom thereof toward the burner 40. The combustion gases generated in the burner 40 may flow upward and may reach the interior space 11 of the heat exchanger 10. Accordingly, in the interior space 11, the tubes 12 received in the interior space 11 may meet the sensible heat generated by the combustion reaction in the burner 40 and the flowing combustion gases.

The upper inner plate 142 is a plate that covers the through-plates 143 and the side plates 145 from above. An exhaust duct 1423 included in the upper inner plate 142 may connect the outside and the interior space 11 and may cause the combustion gases in the interior space 11 to be discharged to the outside. In a case where cold air is introduced into the interior space 11 from the outside through the exhaust duct 1423, wind-chill may occur.

The upper outer plate 141 is a plate that covers the upper inner plate 142 from above. An air supply duct 1413 included in the upper outer plate 141 may connect the interior of the water heating apparatus 1 and the outside. Outside air may be introduced into the water heating apparatus 1 through the air supply duct 1413 and may be finally delivered to the burner 40 through the blower to cause a combustion reaction. The air supply duct 1413 may surround the exhaust duct 1423 to form the shape of a double pipe.

The upper inner plate 142 and the upper outer plate 141 may include an inner plate flange 1421 and an outer plate flange 1411 at the peripheries thereof, respectively. The inner plate flange 1421 may be seated on and coupled to the top sides of the through-plates 143, and the outer plate flange 1411 may be seated on and coupled to the inner plate flange 1421. The couplings may be performed by fasteners 15 that are coupled through inner plate fastening holes 1422 formed in the inner plate flange 1421 and outer plate fastening holes 1412 formed in the outer plate flange 1411. The fasteners 15 may be screws, but are not limited thereto.

A coupling part 22 of the bracket 20, which will be described below, may be seated on the outer plate flange 1411, and the coupling part 22 and the outer plate flange 1411 may be coupled together by the fasteners 15 described above. Accordingly, the coupling part 22 may be coupled to the housing 14 through the fasteners 15.

The through-plates 143 of the housing 14 are plates through which the opposite ends of each tube 12 pass. The through-plates 143 may be formed in a plate shape extending along the left/right direction. Two through-plates 143 may be provided such that the opposite ends of each tube 12 pass through the through-plates 143. The through-plates 143 may be disposed to be spaced apart from each other along the direction in which the tube 12 extends.

The side plates 145 may connect the through-plates 143. Two side plates 145 may connect opposite ends of the two through-plates 143 along the left/right direction. Accordingly, the side plates 145 and inside surfaces of the through-plates 143 may define side surfaces of the interior space 11. In FIGS. 2 to 4, the side plates 145 are omitted for description of the interior space 11 of the heat exchanger 10.

Although it has been described that the side surfaces of the interior space 11 are defined by the through-plates 143 and the side plates 145, the side surfaces of the interior space 11 may be formed by a coupling of two bent plates that are not straight plates. However, the shape and the configuration are not limited thereto.

Figure 5:
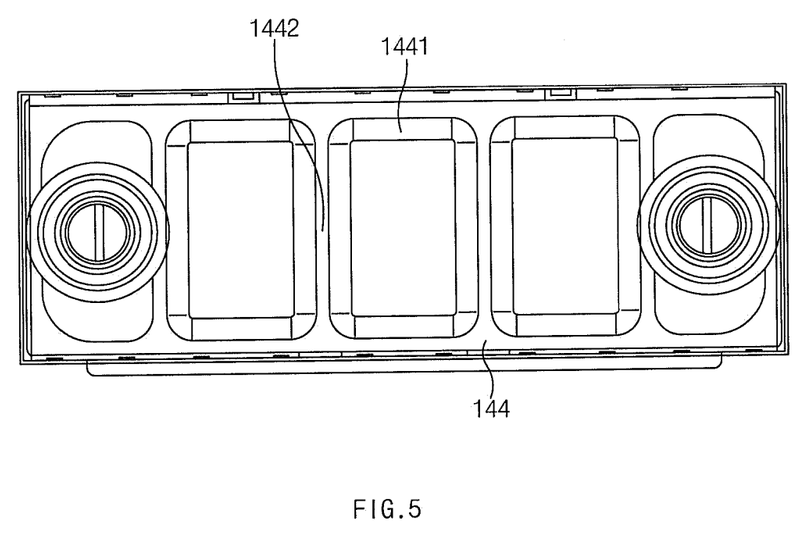
FIG. 5 is a view illustrating a flow passage cap plate of the heat exchanger according to an embodiment of the present disclosure.

FIG. 5 is a view illustrating the flow passage cap plate 144 of the heat exchanger 10 according to an embodiment of the present disclosure.

The flow passage cap plates 144 will be described with additional reference to FIG. 5. The flow passage cap plates 144 may be coupled to the through-plates 143. The same number of flow passage cap plates 144 as the through-plates 143 may be provided. That is, two flow passage cap plates 144 may be provided. The flow passage cap plates 144 are plate-shaped components including the flow passage caps 1441 protruding outward. The flow passage cap plates 144 are coupled to the through-plates 143 to cover the through-plates 143 from the outside. Accordingly, a space in which water flows is formed by concave inside surfaces of the flow passage caps 1441 and parts of the through-plates 143 covered by the flow passage caps 1441. The flow passage cap plates 144 may each have a plurality of flow passage caps 1441.

As end portions of the tubes 12 passing through the through-plates 143 are connected to the spaces formed between the flow passage caps 1441 and the through-plates 143, a flow passage may be formed by the tubes 12 and the flow passage caps 1441. The plurality of tubes 12 may be connected with the flow passage caps 1441, and therefore the flow passage caps 1441 may serve to connect the different tubes 12 in the flow passage.

An odd number of flow passage caps 1441 may be disposed on one flow passage cap plate 144. As illustrated, five flow passage caps 1441 may be disposed. However, the number of flow passage caps 1441 is not limited thereto. The plurality of flow passage caps 1441 may be arranged along the left/right direction.

The temperature sensor 30 is used to obtain the temperature of the housing 14 and prevent the water heating apparatus 1 from being frozen by wind-chill caused by cold air introduced into the interior space 11 from the outside. Accordingly, when the temperature sensor 30 obtains the temperature in the interior space 11, the temperature at which the water heating apparatus 1 is frozen may be most easily recognized, and therefore the processor may appropriately respond. However, in a case where the temperature sensor 30 is disposed in the interior space 11, the temperature sensor 30 may be overheated during operation of the water heating apparatus 1, and therefore the lifetime of the temperature sensor 30 may become shorter.

Accordingly, a method of obtaining the temperature of the housing 14 and inferring the temperature in the interior space 11 from the temperature of the housing 14 may be usefully used. The temperature sensor 30 preferably obtains the temperature of a portion of the housing 14 that has a temperature closest to the temperature in the interior space 11 or has a temperature with the highest correlation.

To obtain a temperature, the temperature sensor 30 may be brought into close contact with a sensor area 1442 between two flow passage caps 1441 adjacent to each other among the plurality of flow passage caps 1441. Specifically, as illustrated, the temperature sensor 30 may be disposed on the sensor area 1442 between the flow passage cap 1441 located in the center among the odd number of flow passage caps 1441 and a flow passage cap most adjacent to the flow passage cap 1441 located in the center.

In a case where the temperature sensor 30 is brought into close contact with the flow passage cap 1441 and obtains the temperature of the flow passage cap 1441, the temperature of the flow passage cap 1441 will not be lowered to 0 degrees Celsius or less until water flowing in the flow passage cap 1141 is frozen. Accordingly, the temperature of a portion of the flow passage cap plate 144 that is located between the flow passage caps 1441 is least affected by the water and is most sensitive to a temperature change in the interior space 11. Therefore, the temperature sensor 30 may be configured to obtain the temperature of the sensor area 1442 located on the portion.

In a case where five flow passage caps 1441 are disposed as illustrated in the drawing, the temperature sensor 30 may obtain a temperature in a state of being brought into close contact with the area between the second and third flow passage caps from the left in FIG. 5 and may transfer the obtained temperature to the processor, and the processor may perform control for freeze protection, based on the received temperature.

Specifically, when the temperature obtained by the temperature sensor 30 is lower than or equal to a predetermined freezing temperature, the processor may perform control such that the burner 40 operates to raise the temperature in the interior space 11 of the heat exchanger 10. Accordingly, the temperature in the interior space 11 may be raised, and thus water flowing through the tubes 12 may be prevented from being frozen.

In a case where the temperature of the sensor area 1442 obtained by the temperature sensor 30 is higher than or equal to a predetermined upper limit, the processor may perform control such that the combustion reaction in the burner 40 is stopped.

Bracket (20)

Figure 6:
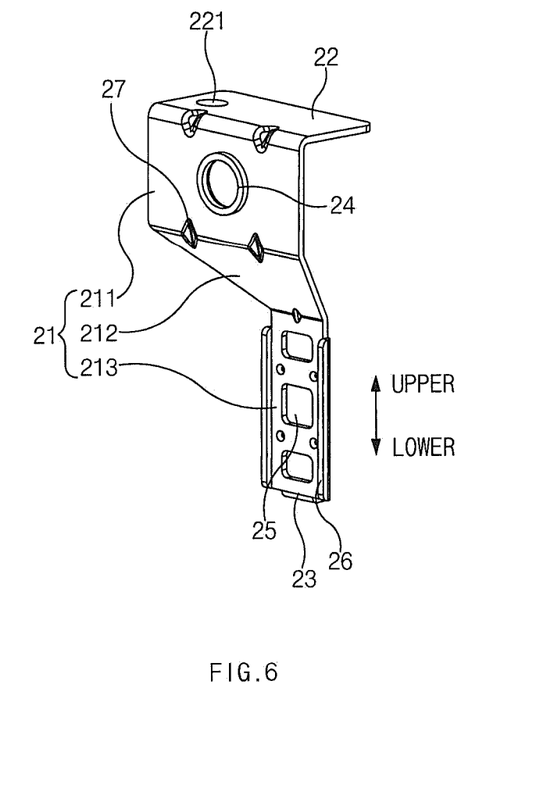
FIG. 6 is a perspective view of a bracket according to an embodiment of the present disclosure.

FIG. 6 is a perspective view of the bracket 20 according to an embodiment of the present disclosure.

The bracket 20 is a component that brings the temperature sensor 30 into close contact with a predetermined position. The bracket 20 may be coupled to the housing 14 to bring the temperature sensor 30 into close contact with the sensor area 1442. Accordingly, the position where the bracket 20 is connected to the housing 14 may be adjacent to the sensor area 1442.

The bracket 20 may be coupled to the housing 14 and has to be able to bring the temperature sensor 30 into close contact with the sensor area 1442. The bracket 20 may include a coupling part 22 and a body 21.

The coupling part 22 is a part that is coupled to the housing 14 and that prevents the bracket 20 from escaping from the housing 14. The coupling part 22 may have a coupling hole 221 formed therein. The fastener 15, which fasten the outer plate flange 1411, the inner plate flange 1421, and the through-plate 143, may be coupled through the coupling hole 221. Accordingly, the housing 14 and the bracket 20 may be coupled together by the fastener 15. To enable the coupling, the coupling part 22 may be disposed parallel to a horizontal plane, similarly to the outer plate flange 1411, the inner plate flange 1421, and the upper end of the through-plate 143 that are formed like horizontal planes.

The coupling part 22 may have a portion protruding outward from the housing 14. The body 21 may extend from the portion of the coupling part 22 that protrudes outward.

The body 21 is a part that extends in a bent structure from the coupling part 22 toward the sensor area 1442 to bring the temperature sensor 30 into close contact with the sensor area 1442. In the state in which the coupling part 22 is coupled to the top side of the through-plate 143 from above the flow passage cap plate 144 as in the embodiment of the present disclosure, the body 21 may extend from the coupling part 22 toward the housing 14 and the lower direction. However, in a case where the coupling part 22 is coupled to a lower side of the through-plate 143, that is, the coupling part 22 is disposed at a different position, the direction in which the body 21 faces may be changed.

The body 21 may include a plurality of body pieces 211, 212, and 213. Specifically, the body 21 may include the first body piece 211, the second body piece 212, and the third body piece 213. However, the number of body pieces is not limited thereto.

The first body piece 211 may extend downward from the coupling part 22. The second body piece 212 may extend from the first body piece 211 in a downwardly inclined direction toward the housing 14. The third body piece 213 may extend downward from the second body piece 212 to cover the sensor area 1442 between the flow passage caps 1441 when the coupling part 22 is coupled to the housing 14.

The second body piece 212 may have a trapezoidal shape having a gradually decreasing width toward the lower direction. The width of the first body piece 211 in the left/right direction may be greater than the width of the third body piece 213.

The bracket 20 may further include protrusions 27 formed on the borders between the body pieces 211, 212, and 213 constituting the body 21. The protrusions 27 may be formed by caulking. The body 21 of the bracket 20 in the bent structure may be reinforced with the protrusions 27.

The bracket 20 may further include a stopper 23 that extends from a lower end of the third body piece 213 of the body 21 toward the housing 14 to hinder the temperature sensor 30 from escaping in the lower direction when the bracket 20 is disposed as in the embodiment of the present disclosure. The stopper 23 may prevent an escape of the temperature sensor 30 from the sensor area 1442 in the lower direction by the weight of the temperature sensor 30.

The third body piece 213 may have a plurality of through-holes 25. The plurality of through-holes 25 may be formed in the third body piece 213 so as to be spaced apart from each other. Furthermore, protrusions 26 may be formed in a direction away from the housing 14 along part of the periphery of the third body piece 213.

The body 21 may have a wire hole 24 formed therein. The wire 32 connected to the temperature sensor 30 may pass through the wire hole 24. The wire hole 24 may be formed in the first body piece 211.

Figure 7:
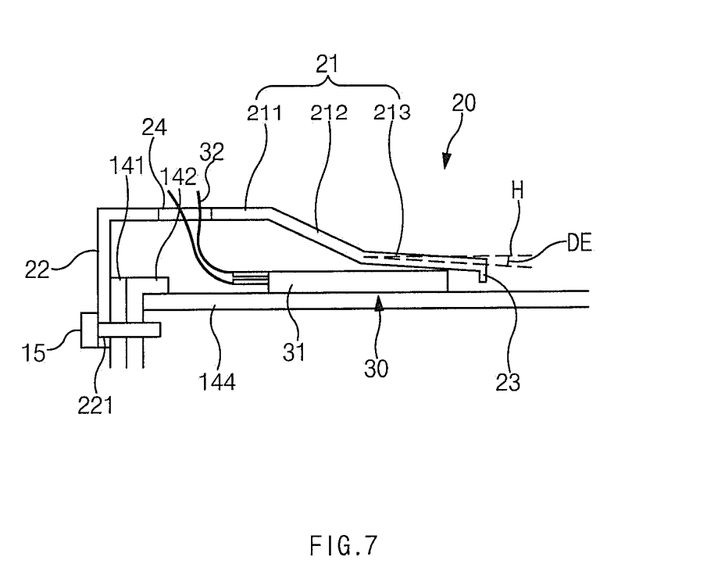
FIG. 7 is a view illustrating a situation in which a temperature sensor is fixed by the bracket according to an embodiment of the present disclosure.

FIG. 7 is a view illustrating a situation in which the temperature sensor 30 is fixed by the bracket 20 according to an embodiment of the present disclosure.

The third body piece 213 may have a shape downwardly inclined toward the flow passage cap plate 144 to press the temperature sensor 30 toward the housing 14 and bring the temperature sensor 30 into close contact with the flow passage cap plate 144. Accordingly, the third body piece 213 may be downwardly inclined to form a predetermined angle DE with respect to a horizontal line H in FIG. 7.

When the temperature sensor 30 is disposed in a sensor space by the third body piece 213 formed as illustrated, the third body piece 213 may make contact with part of the temperature sensor 30 and may press the temperature sensor 30 toward the housing 14. Furthermore, because the distance by which the third body piece 213 and the housing 14 are spaced apart from each other is decreased toward the lower direction, the temperature sensor 30 may not be able to escape from the sensor area 1442 in the lower direction.

In a modified example of the embodiment of the present disclosure, a first body piece may be formed to be inclined toward a flow passage cap plate and may perform a similar operation.

Accordingly, the water heating apparatus may be efficiently prevented from freezing.

Hereinabove, even though all of the components are coupled into one body or operate in a combined state in the description of the above-mentioned embodiments of the present disclosure, the present disclosure is not limited to these embodiments. That is, all of the components may operate in one or more selective combination within the range of the purpose of the present disclosure. It should be also understood that the terms of "include", "comprise" or "have" in the specification are "open type" expressions just to say that the corresponding components exist and, unless specifically described to the contrary, do not exclude but may include additional components. Unless otherwise defined, all terms used herein, including technical and scientific terms, have the same meaning as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A heat exchanger comprising:
a plurality of tubes through which heating water flows;
a housing having an interior space in which the plurality of tubes are disposed and through which a combustion gas passes, the housing including a plurality of flow passage caps connected with distal ends of the plurality of tubes to cause the heating water to flow through the flow passage caps;
a temperature sensor brought into close contact with an area between two flow passage caps adjacent to each other among the plurality of flow passage caps to obtain a temperature; and
a bracket coupled to the housing to bring the temperature sensor into close contact with the area between the adjacent two flow passage caps,
wherein the bracket includes:
a coupling part coupled to the housing;
a body extending from the coupling part toward a lower direction to bring the temperature sensor into close contact with the area between the flow passage caps of the housing; and
a stopper extending from a lower end of the body toward the housing to hinder the temperature sensor from escaping in the lower direction.

2. The heat exchanger of claim 1, wherein the body extends in a bent structure from the coupling part toward the housing and the lower direction to bring the temperature sensor into close contact with the area between the flow passage caps of the housing.

3. The heat exchanger of claim 2, wherein the body includes:
a first body piece extending downward from the coupling part;
a second body piece extending from the first body piece in a downwardly inclined direction toward the housing; and
a third body piece extending downward from the second body piece to cover the area between the flow passage caps when the coupling part is coupled to the housing.

4. The heat exchanger of claim 3, wherein the second body piece has a trapezoidal shape having a gradually decreasing width toward the lower direction.

5. The heat exchanger of claim 3, wherein the third body piece has a shape downwardly inclined toward the housing to press the temperature sensor toward the housing and bring the temperature sensor into close contact with the housing.

6. The heat exchanger of claim 2, further comprising:
protrusions formed on borders between portions constituting the body to reinforce the body.

7. The heat exchanger of claim 2, further comprising:
a wire hole formed in the body, wherein a wire connected to the temperature sensor passes through the wire hole.

8. The heat exchanger of claim 7, wherein the body include a first body piece extending downward from the coupling part, and
wherein the wire hole is formed in the first body piece.

9. The heat exchanger of claim 1, wherein the housing includes an odd number of flow passage caps arranged on one side surface thereof along a left/right direction, and
wherein the temperature sensor is disposed between a flow passage cap located in the center among the odd number of flow passage caps and a flow passage cap adjacent to the flow passage cap located in the center.

10. A bracket for bringing a temperature sensor into close contact with a housing such that the temperature sensor obtains temperature of the housing configured to surround an interior space of a heat exchanger, the bracket comprising:
a coupling part coupled to the housing;
a body extending in a bent structure from the coupling part toward an area between flow passage caps to bring the temperature sensor into close contact with the area between the flow passage caps of the housing; and
a stopper extending from a lower end of the body toward the housing to hinder the temperature sensor from escaping in the lower direction.

11. A water heating apparatus comprising:
a burner configured to cause a combustion reaction;
a heat exchanger including tubes through which heating water flows, an interior space in which a combustion gas generated by the combustion reaction exchanges heat with the tubes, and a plurality of flow passage caps connected with distal ends of the tubes to cause the heating water to flow through the flow passage caps;
a temperature sensor brought into close contact with an area between two flow passage caps adjacent to each other among the plurality of flow passage caps to obtain a temperature;
a bracket coupled to the heat exchanger to bring the temperature sensor into close contact with the heat exchanger; and a processor electrically connected with the temperature sensor and the burner and configured to perform control such that the burner operates when the temperature obtained by the temperature sensor is lower than or equal to a predetermined freezing temperature, wherein the bracket includes:

a coupling part coupled to the housing;

a body extending from the coupling part toward a lower direction to bring the temperature sensor into close contact with the area between the flow passage caps of the housing; and a stopper extending from a lower end of the body toward the housing to hinder the temperature sensor from escaping in the lower direction.

\* \* \* \* \*